United States Patent [19]

Schoppe

[11] Patent Number: 4,746,250
[45] Date of Patent: May 24, 1988

[54] DEVICE FOR INTRODUCING A DOSED QUANTITY OF POWDER INTO A CARRIER GAS STREAM

[76] Inventor: Fritz Schoppe, Gustav-Adolf-Strasse 5, D-8192 Geretsried 2, Fed. Rep. of Germany

[21] Appl. No.: 920,983

[22] PCT Filed: Jan. 21, 1985

[86] PCT No.: PCT/DE85/00016
§ 371 Date: Sep. 9, 1986
§ 102(e) Date: Sep. 9, 1986

[87] PCT Pub. No.: WO86/04316
PCT Pub. Date: Jul. 31, 1986

[51] Int. Cl.[4] .............................................. B65G 53/46
[52] U.S. Cl. ........................................ 406/63; 406/66; 406/135; 406/141; 222/331
[58] Field of Search ................. 406/63, 66, 68, 91, 406/123, 135, 142, 143; 222/331, 370, 636

[56] References Cited
U.S. PATENT DOCUMENTS

| 2,314,031 | 3/1943 | Colburn | 406/63 |
| 2,712,963 | 7/1955 | Edwards | 406/63 |
| 2,740,672 | 4/1956 | Morrow | 406/63 |
| 3,318,641 | 5/1967 | Mommsen | 406/63 |
| 4,200,414 | 4/1980 | Link | 406/63 |
| 4,560,094 | 12/1985 | Eales | 406/123 X |
| 4,646,943 | 3/1987 | Häfner | 406/63 X |
| 4,661,024 | 4/1987 | Häfner | 406/66 X |

Primary Examiner—Joseph F. Peters, Jr.
Assistant Examiner—James M. Kannofsky
Attorney, Agent, or Firm—Brooks Haidt Haffner & Delahunty

[57] ABSTRACT

An apparatus for the dosed incorporated of a dustlike substance into a carrier gas stream is described; said apparatus operates on the basis of a perforated disc which rotates in the dust, the passage holes of said disc are filled with the dust and are blown out in a blowing zone. Since a predetermined blowing pressure is maintained and owing to a suitable dimensioning and arrangement of the passage holes, a remarkable increase in the throughput of dust is achieved, compared with the prior known matter.

13 Claims, 6 Drawing Sheets

DEVICE FOR INTRODUCING A DOSED QUANTITY OF POWDER INTO A CARRIER GAS STREAM

Figure 1:
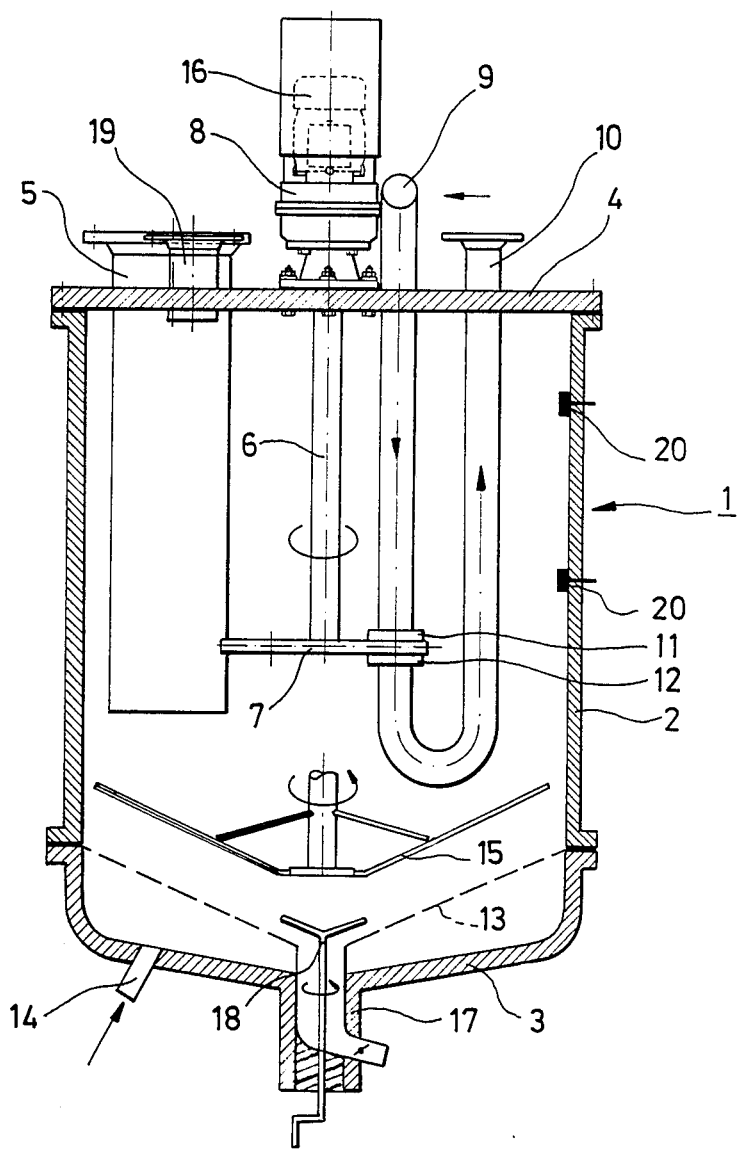
Figure 2:
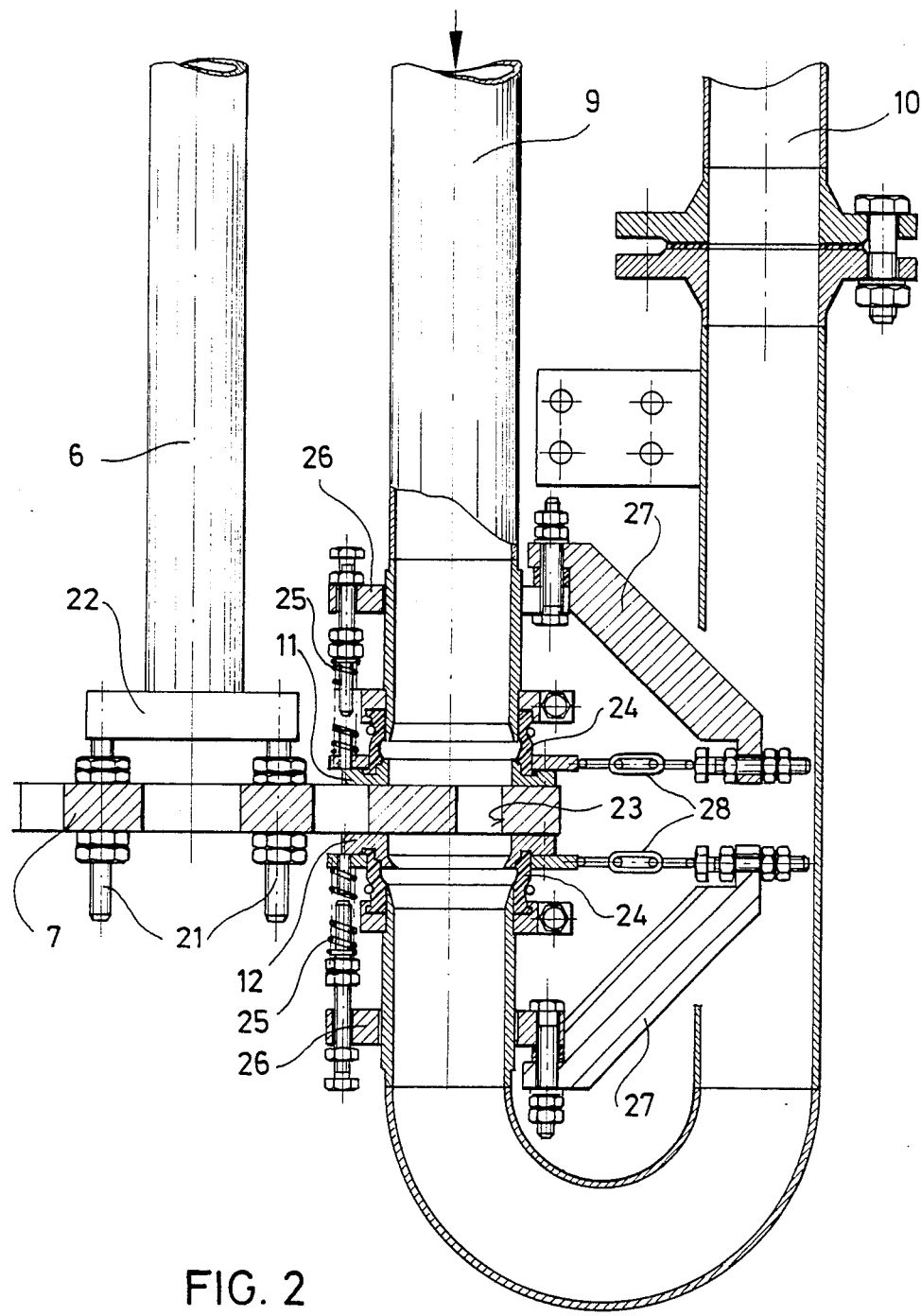

This invention relates to an apparatus for the dosed incorporation of a dustlike solid substance into a carrier gas stream.

Such an apparatus is known from the German Auslegeschrift No. 27 28 386. This printed matter shows and describes an apparatus in the case of which the dustlike solid is stored in loose form in a reservoir, where it may be loosened, if need be, with gas. A slowly rotating shaft is immersed in the dustlike solid, the shaft carrying a disc thin in comparison with the diameter. In an annular zone relatively far outside, said disc is provided with a rim of small passage holes parallel in axis. Upon rotation of the disc through the dustlike solid, the passage holes are filled therewith. A carrier gas line parallel in axis terminates in at least one point on the disc to permit the carrier gas to blow the dustlike solid out of the passage holes met by the carrier gas stream. In the extension of the carrier gas line, on the other side of the disc, there is provided a discharge line for transporting the carrier gas and the dustlike solid taken up by the carrier gas away. Both lines are sealed against the disc by means of slide ring sealings.

Since the diameter of the passage holes in the disc is very small in comparison with the flow area of the carrier gas and since the passage holes are disposed in close proximity with respect to one another, a non-pulsating conveying is achieved with this apparatus. A disadvantage, though, results from the fact that this apparatus can only be employed in cases where the throughput of solids is small, while greater throughputs of solids are not possible at all. It is true that in order to increase the throughput of solids, the number of disc revolutions can be increased. Up from a particular speed, however, the individual holes are no longer completely filled and finally, a further increase in speed no longer results in a higher throughput of solids at all. A test made by the inventor to increase throughput performance by increasing the thickness of the disc failed, since, as was found, the dustlike solid only enters the individual holes at a limited rate and fills them. Hence, when the thickness of the disc is increased, the speed of the disc is to be reduced accordingly in order to still obtain a sufficient filling of the holes.

It is an object of the present invention to improve an apparatus of the type described hereinbefore such that, related to the same blow-out area, the throughput of solids is increased by many times over, while a nonpulsating operation is maintained.

Compared with the prior known apparatus, there are only a few passage holes disposed in the blow-out area of the apparatus according to the invention, this area being defined at the cross-section, the carrier gas line has at the point of opening in the region of the disc. Despite the reduced number of passage holes located in the blow-out area, a non-pulsating solid incorporation into the carrier gas stream is acquired.

The invention makes use of the knowledge that, when the passage holes are of suitable design and construction, the carrier gas issuing into the respective hole creates a turbulence in said hole as soon as only a fragment of the hole cross-section is exposed to the carrier gas stream. This turbulence results in a uniform blowing out operation of the hole, which is already finished, when only one third of the hydraulic cross-section of the hole is exposed to the blow-out area. The turbulence formation referred to and a stream suited for the blowing out operation, however, can only be achieved when the stagnation pressure of the carrier gas in the passage holes consists in a specific minimum pressure.

A preferred embodiment of the present invention shall now be described in detail with reference to the accompanying drawings, wherein FIG. 1 is an illustration under report of an apparatus to be used with pulverized coal;

FIG. 2 shows a detail of the apparatus according to FIG. 1 in the region of the disc;

FIG. 3 shows a top view of a sliding sealing ring;

FIGS. 3(A) and 3(B) show sectional views of the sliding ring of FIG. 3;

FIG. 4 shows a detail from a drilling template for the production of the disc;

FIG. 5 shows a radial arrangement of slots; and

FIG. 6 shows slots arranged at an angle with respect to the radius.

The apparatus according to FIG. 1 includes a reservoir 1 comprising a preferably cylindrical, vertically disposed jacket 2 having a bottoom 3 secured to the lower end thereof and a cover 4 screwed onto said jacket. Through cover 4, a filler tube 5 extends for the injection of pulverized coal, more than half of the tube immersing in the reservoir 1. Furthermore, a shaft 6 eccentrically extends into reservoir 1 through cover 4, said shaft supporting a perforated disc 7 at the lower end thereof and being driven by a gear motor 8 fixed to cover 4. Disc 7 is approximately positioned in the middle of the reservoir height, above the lower end of filler tube 5.

It is essential that the length of the holes, i.e. the thickness of the disc, and the hydraulic diameter of the holes be in a distinct range of ratios. This ratio should be smaller than 5, preferably smaller than 2.5. Furthermore, the dimensions of the disc holes and the opening area of the tube as well as the arrangement of the disc holes are to be so selected that only approximately 4 to 8 holes are located within the opening area at a time and a hole enters said opening area upon rotation of said disc when almost a third of the cross-section of a directly preceding hole is already located within said opening area.

Through cover 4, there further extend two tubes 9 and 10 of a carrier air line terminating on both sides of the disc 7 at opposed sliding rings 11, 12.

Above bottom 3, in spaced apart relation thereto, there is disposed a flow bottom 13 provided with holes. In the space between flow bottom 13 and reservoir bottom 3 terminates an air blow line 14 extending through the latter. Above the flow bottom 13, in the reservoir axis, there is positioned a stirrer 15 adapted to be driven by a gear motor 16 via a shaft penetrating through cover 4.

Bottom 3 has a lock-up discharge 17 through which a manually operated agitator 18 extends. When operation is interrupted, reservoir 1 can be drained by means of said discharge and impurities accumulated on the flow bottom can be removed.

An air exhaust 19 provided in cover 4 serves the purpose of withdrawing air blown into through flow bottom 13 as well as air possibly escaping at disc 7.

Level sensing probes 20 provided at the reservoir jacket 2 serve the purpose of monitoring the level of the reservoir 1.

FIG. 2 shows the detail from FIG. 1 at the rotating disc 7. By means of screws bolts 21, the disc 7 is secured to a plate 22, in spaced apart relation, which in turn is secured to shaft 6. The distance between plate 22 and disc 7 assures in co-action with a plurality of holes also provided in disc 7 in the zone not exposed to the blow-out area, that the loose, flowable state of the pulverized coal is disturbed by disc 7 as little as possible.

Disc 7 is provided with a plurality of passage holes 23 one of which is located in the region of the blow-out area in FIG. 2. Tubes 9 and 10 terminate at disc 7, tube 9 being used for the supply of the carrier gas and tube 10 serving the discharge of the carrier gas mixed with pulverized coal. The ends of tubes 9 and 10 are respectively connected with the sliding rings 11, 12 through resilient collars 24 made of rubber or like material, the sliding rings 11, 12, in opposed relation, being adjacent either side of the disc 7 and sealing said disc at the tubes 9, 10. The sliding rings are pressed against disc 7 by means of coil springs 25 being respectively supported by a flange 26 in communication with the associated tube 9, 10. Each of said flanges 26 has secured thereto at least three obliquely extending arms 27 approximately projecting into the plane of the sliding rings 11, 12, one of said arms each being illustrated in FIG. 2. The arms act as a means for anchoring movable holding elements, in the embodiment shown, chains 28 having their respective other ends connected to the sliding rings 11, 12, and diverting the frictional forces caused by the rotation of the disc 7 toward the tubes 9, 10, which are of sufficient stiffness. It goes without saying that the arms are distributed such that in either direction of rotation of the disc, the frictional forces are received by the chains as tensile forces.

Figure 3:
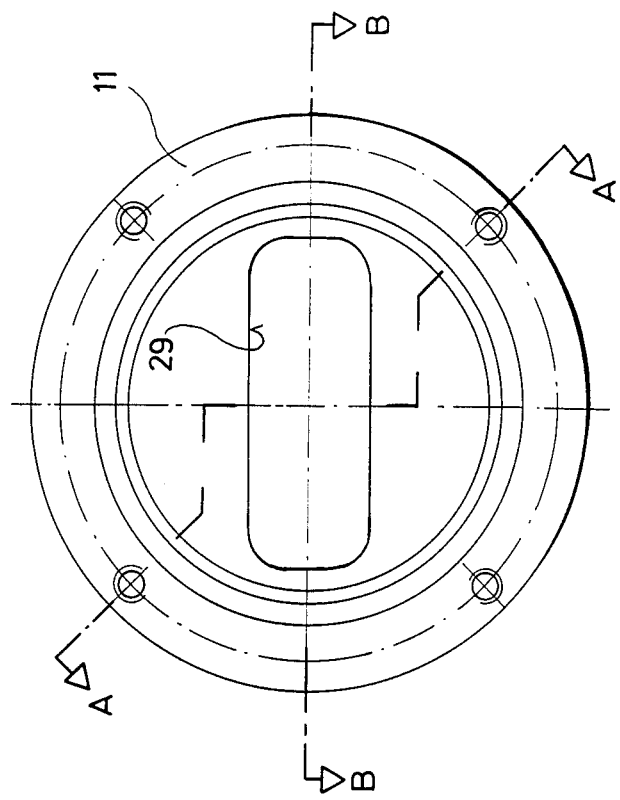
Figure 3A:
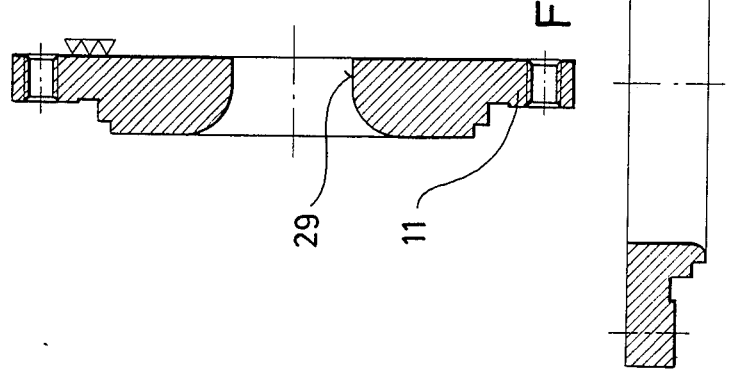
Figure 3B:

FIG. 3 shows a top view of the upper sliding ring 11 whereas FIGS. 3(A) and 3(B) show sectional views thereof along lines A—A and B—B, respectively, of the sliding ring of FIG. 3. As apparent, the sliding ring 11 has a nozzle aperture 29 of a substantially longish, rectangular cross-section. On the carrier gas entering side, the edges of the nozzle aperture 29 are rounded, while they are sharp-edged on the disc 7 facing side (not shown in FIG. 3).

With respect to the disc 7, sliding ring 11 is disposed such that an angle of 15° is defined by the longitudinal axis of the nozzle aperture 29 and a radius extending through the center of the nozzle aperture. Consequently, the nozzle aperture is located substantially transversely to the direction of movement of the passage holes 23 in the disc.

The opposed sliding ring 12 located downstream has a circular opening for receiving the pulverized coal blown out from the passage holes 23.

As described, a very particular claim is made on the assembly of the passage holes 23 in disc 7, which assembly is supposed to ensure that a non-pulsating supply of pulverized coal to the carrier gas stream results.

Figure 4:
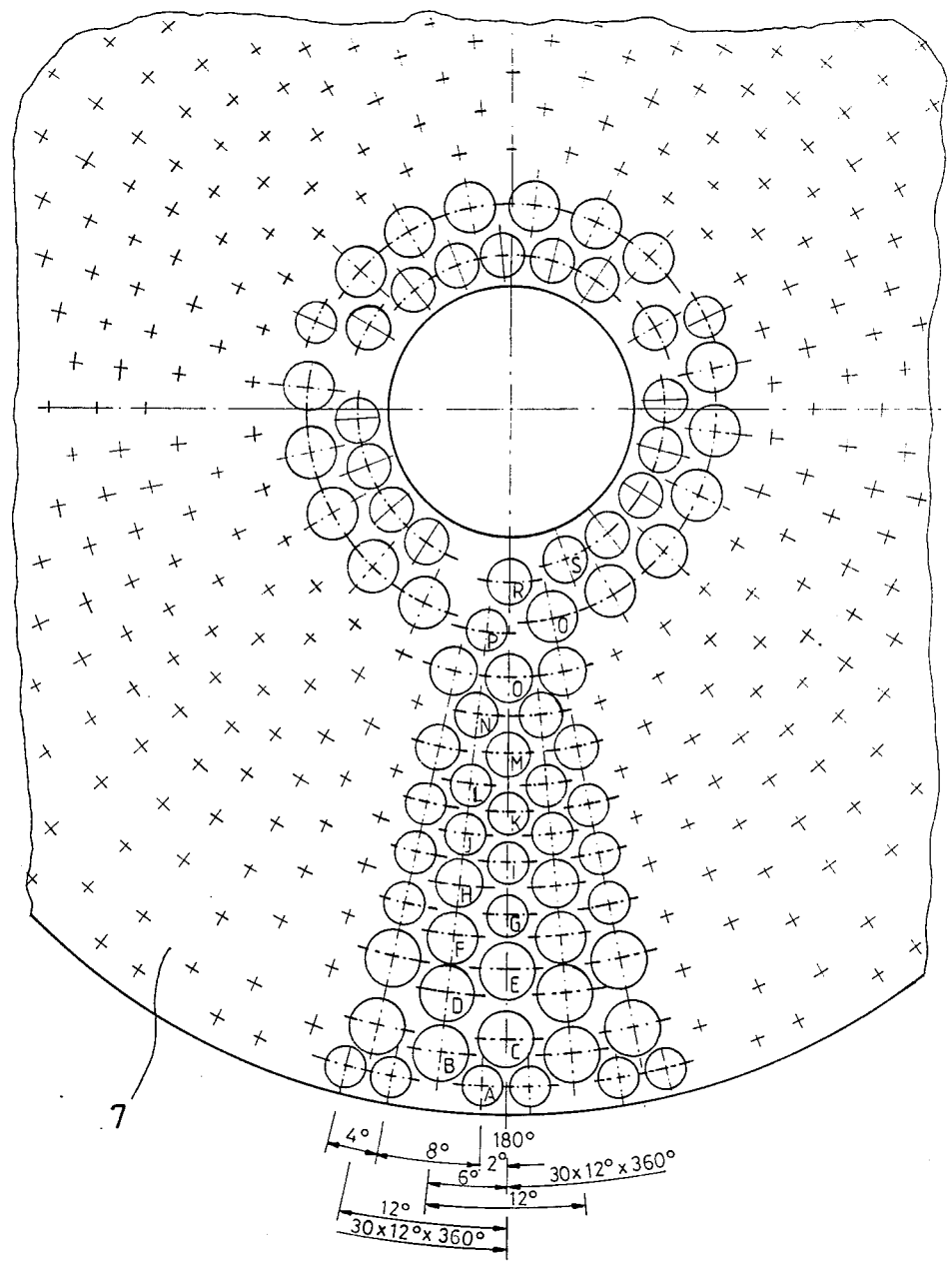

FIG. 4 shows a drilling template for the production of a disc to be employed in cooperation with the nozzle cross-section according to FIG. 3. Out of the holes shown, those designated B to I may reach the area of the nozzle aperture 29 of the upper sliding ring 11, the holes R serve the purpose of securing the disc 7 to plate 22, while holes A and J to Q and S as well as the central opening are only provided for the purpose of not disturbing the fluidized state of the pulverized coal.

With the exception of agitator 18 and sensing probes 20, all of the elements described, are secured to cover 4 as is apparent from FIG. 1 so that, upon failure and for the purpose of maintenance and cleaning, the entire aggregate is easily accessible by loosening the cover 4 and removing it from reservoir 1.

In operation, pulverized coal is filled into reservoir 1 via filler tube 5 to such an extend that the upper sensing probe 20 applies a corresponding signal. Disc 7 is then completely immersed in pulverized coal. With the aid of blow air injected through air line 14 and uniformly spreading below flow bottom 13, through the holes of which it penetrates into the pulverized coal and/or with the aid of stirrer 15, the pulverized coal comprised in reservoir 1 can be converted to a loose and up to a fluidized state. The air blown into through air line 14 is discharged from reservoir 1 through tube 19.

The pulverized coal fills the holes in disc 7. Through tube 9, a carrier gas is blown onto disc 7, the carrier gas having a pressure higher than that prevailing in reservoir 1. This carrier gas stream blows the pulverized coal out of the passage holes exposed to the nozzle aperture 29 of the sliding ring 11 into sliding ring 12 located thereunder, wherefrom the carrier gas stream now conveying the pulverized coal is withdrawn outwardly through tube 10.

By rotation of the disc 7 new passage holes 23 filled with pulverized coal are again and again exposed to the blow area and drained passage holes are removed from the blow area.

The carrier gas stream is so adjusted that the stagnation pressure is at least 10 mm column of water, preferably more than 14 mm column of water. As soon as a part of a passage hole is exposed to the carrier gas stream, as a consequence of this pressure, a turbulence is created in the passage hole due to flow interruption, said turbulence effecting a uniform flushing of the passage hole.

Tests showed that, over a wide speed range, the apparatus according to the present invention provides a linear connection between the quantity of pulverized coal incorporated into the gas stream and the disc speed. The apparatus according to the invention as well, shows that, from a specific upper speed on, the quantity of pulverized coal incorporated no longer linearly increases with the speed of the disc, that, however, at this speed, the conveying capacity of the apparatus according to the invention is approximately three times the capacity of the prior known apparatus, with all the other conditions being comparable.

Tests proved that, when the upper speed referred to is considered as an upper limit, in a speed range 1:50, a non-pulsating operation of the apparatus is assured with a linear connection between speed and incorporated quantity of pulverized coal.

When the pulverized coal level in reservoir 1 drops below the level of the lower sensing probe 20, a corresponding signal is applied providing for a corresponding re-filling of the reservoir. The circuit measures therefor, have not been shown. The lower sensing probe 20 is positioned at a sufficiently high location so that even at low level in reservoir 1, disc 7 will be excluded from being not immersed in the pulverized coal and, so to speak, from running "dry".

Due to the fact that, according to the invention, only a few large passage holes 23 are disposed within the blow-out area 29 of the carrier gas line, it is acquired, that these holes are no longer small in comparison with the carrier gas line and the thickness of the disc but are of comparable order of magnitude. As a consequence of the large cross-section, the passasge holes are very rapidly filled with pulverized coal, what involves the application of great disc thicknesses and high disc speeds without the filling of the passage holes 23 being lessened. Consequently, extremely high conveying capacities of up to approximately 20 tons per hour of pulverized coal can be acquired at a blow area at the upper sliding ring 11 of approximately 15 cm². On the other hand, the invention permits, as mentioned, very low speeds and, thus, very low conveying capacities, since the flushing of each passage hole 23 lasts for a specific, though very short period of time. The next passage hole 23 has not to be exposed to the blow area until this period of time has expired.

The thus resulting minimum speed ranges in the order of magnitude of one revolution per minute, so that, with the dimensions described, minimum conveying capacities of approximately 10 kg/h of pulverized coal can be obtained. Consequently, this dosing apparatus provides a surprisingly wide working range both upwards and downwards. This in turn is the prerequisite for the fact that the pulverized coal burners fed with the coal dust achieve a range of control hitherto unknown. Usually, a speed range from 1:3 to 1:5 is already deemed excellent. Burner speed ranges from 1:40 to 1:50 can be achieved with the apparatus according to the present invention. This is turn is a prerequisite for the flexible adaptation of the firing capacity to the consumption and, thus, for a clear decrease in the quantity of pulverized coal required. Measurements showed, that on the basis of the enlarged speed range, only, the heat consumption of a firing could be reduced on an average by approximately 4% a year.

Figure 5:
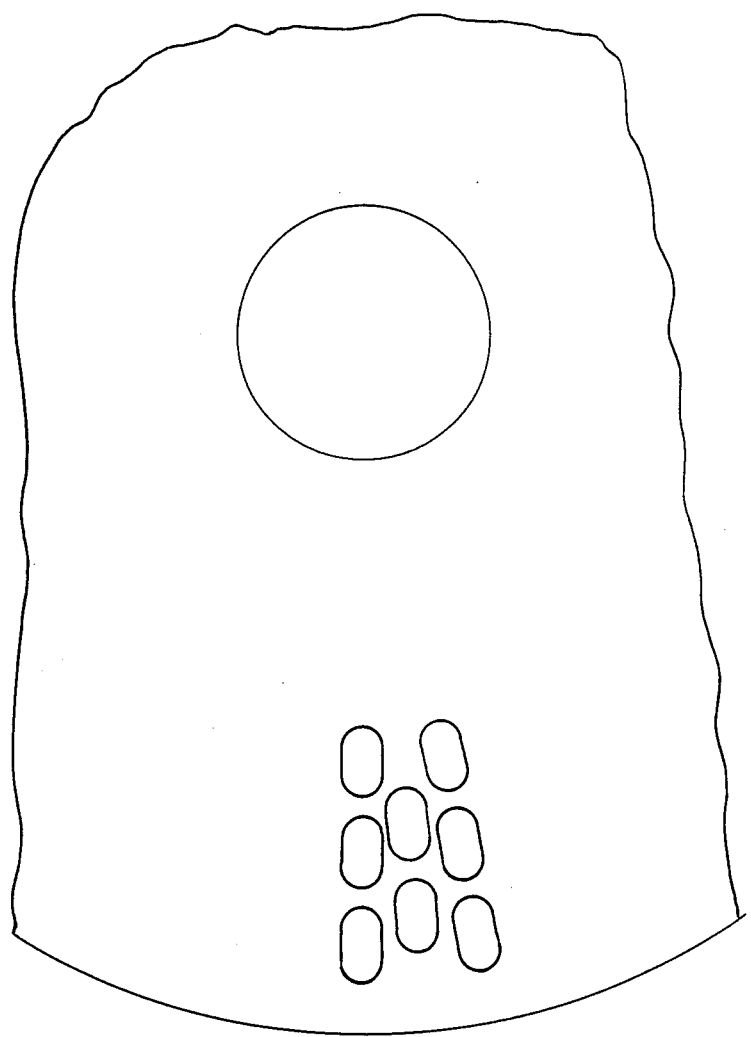
Figure 6:
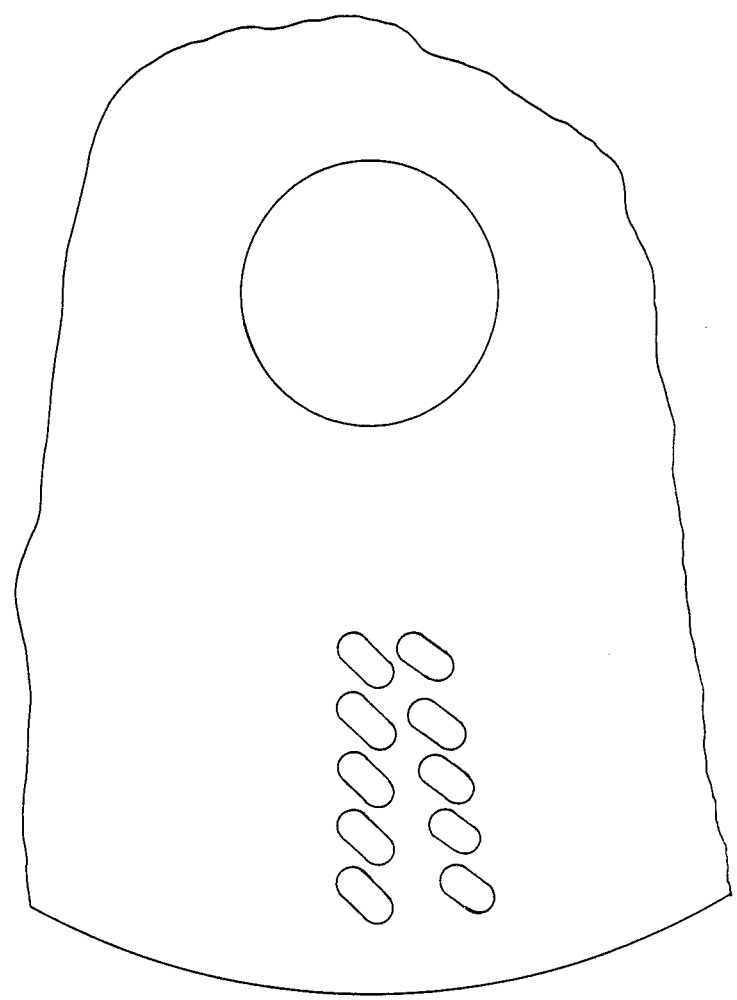

In the embodiment described hereinbefore, the passage holes 23 are shown as circular cylindrical bores for they may be of any shape, for example, they may have the form of slots, which may be also arranged as desired, for example, radially or at an angle with respect to the radius as shown in FIGS. 5 and 6.

Another matter not essential for the invention is the feature that the carrier gas line 9 approaches disc 7 from the top and the take-up line 10 then continues to extend downwards. The two directions of flow of the two lines may rather be also interchanged, for example, in cases where inside of the lower bent portion of line 10 greater wear is otherwise expected, for example, due to particularly abrasive dust.

Furthermore, the arrangement of shaft 6 shown in FIG. 1 as a vertical arrangement is not essential for the invention; what is only achieved by this type of arrangement is a simple sealing of the openings in cover 4 or other walls of reservoir 1 through which the shafts extend, since due to this type of arrangement the openings for the shafts are located outside of the pulverized coal level. The shafts may be passed through the walls of reservoir 1 at any location and may extend in any direction.

If the cross-section of the passage holes 7 is not circular cylindrical but is of different configuration, for example, has the shape of a slot, the diameter is the hydraulic diameter of the cross-section of the holes pursuant to the prior known rules of fluid mechanics.

Neither need the passage holes be arranged in a manner parallel in axis. Depending on the grain size and the properties of the dust to be conveyed, the holes 23 may be also disposed obliquely with respect to the axis about which disc 7 rotates.

Finally, it is to be mentioned that—if there is enough space—a plurality of dosing units including both disc and tubing system may, if need be, be disposed in a reservoir.

I claim:

1. An apparatus for the dosed incorporation of a dust-like substance into a carrier gas stream being under increased pressure, comprising means for providing said carrier gas stream, a reservoir for receiving solid dust, means for converting the dust to a flowable state, a rotatingly driven disc submerged in the dust within said reservoir, and a tube traversing said reservoir and conveying the carrier gas stream, said tube being severed in the region of said disc and including two openings each having an opening area and enclosing therebetween, in sandwiched fashion, a partial area of said disc provided with passage holes, said passage holes having a length and a hydraulic diameter, wherein the ratio that said length bears to said hydraulic diameter is smaller than 5 and the dimensions of the disc holes and of the opening area of the tube as well as the arrangement of the holes are so selected that only approximately 4 to 8 holes are located in the opening area at a time and that a hole enters said opening area upon rotation of said disc when almost a third of the cross-section of a directly preceding hole is already located within said opening area, and wherein said means for providing said carrier gas stream are adapted to provide a dynamic pressure of said carrier gas stream of at least 10 mm column of water.

2. An apparatus according to claim 1 characterized in that said holes in the disc are formed as circular cylindrical bores.

3. An apparatus according to claim 1 characterized in that the holes are formed as slots.

4. An apparatus according to claim 3 characterized in that the slots are radially disposed in said disc.

5. An apparatus according to claim 3 characterized in that the slots define an angle with respect to the radius.

6. An apparatus according to claim 1 wherein the tube is provided with sliding rings connected with said tube openings via resilient collars and being resiliently pressed against said disc.

7. An apparatus according to claim 6 wherein frictional forces between said disc and said sliding rings are diverted by movable elements.

8. An apparatus as claimed in claim 7 wherein said movable elements are chains.

9. An apparatus according to claim 1 wherein a mechanically operating homogenization means, immersed in the solid dust, is disposed in said reservoir.

10. An apparatus according to claim 1 wherein a discharge is located in the reservoir bottom and discharge aids are provided to remove the solid dust through said discharge.

11. An apparatus according to claim 10 wherein said discharge aid is a manually operated agitator.

12. An apparatus as claimed in claim 1 wherein said ratio that the length of the hole bears to the hydraulic diameter thereof is smaller than 2.5.

13. An apparatus as claimed in claim 1 wherein said means for providing said carrier gas stream are adapted to provide a dynamic pressure of said carrier gas stream of at least a 14 mm column of water.

* * * * *